United States Patent

[11] 3,624,528

[72] Inventors Richard H. Adlhock Bellwood; Gerald L. Giacomino, Chicago, both of Ill.

[21] Appl. No. 49,000
[22] Filed June 23, 1970
[45] Patented Nov. 30, 1971
[73] Assignee Motorola, Inc. Franklin Park, Ill.

[54] DIGITAL DEMODULATOR
15 Claims, 2 Drawing Figs.

[52] U.S. Cl. .......... 329/104, 178/66, 325/320, 328/109, 329/126
[51] Int. Cl. .......... H04l 27/14
[50] Field of Search .......... 329/126, 104, 106; 328/109, 110, 112; 325/30, 320; 178/66

[56] References Cited

UNITED STATES PATENTS

| | | | |
|---|---|---|---|
| 3,013,211 | 12/1961 | Garabedian | 328/109 |
| 3,233,181 | 2/1966 | Calfee | 325/30 X |
| 3,348,153 | 10/1967 | Featherston | 329/126 X |
| 3,522,539 | 8/1970 | Levine et al. | 325/320 |
| 3,526,843 | 9/1970 | Sanville | 329/104 |

*Primary Examiner*—Alfred L. Brody
*Attorney*—Mueller & Aichele

ABSTRACT: A digital demodulator for demodulating a received bit signal containing binary and timing information wherein the signal shifts between two levels. Transition detectors respond to shifts between the two levels to produce pulses. A pulse at the beginning of each bit period represents timing information and is followed by pulses representing binary information. The timing pulse energizes a monostable which in turn enables a bistable to count pulses occurring while the monostable is energized. The monostable remains energized for 75 percent of the bit period, and when the monostable is deenergized, the state of the bistable is sampled and stored by a shift register. The energization and deenergization of the monostable is used to produce first and second timing pulses. The binary information and timing pulses are used to operate a digital decoder.

PATENTED NOV 30 1971 3,624,528

INVENTORS
RICHARD H. ADLHOCH
GERALD L. GIACOMINO
BY Mueller & Aichele
ATTYS.

DIGITAL DEMODULATOR

BACKGROUND OF THE INVENTION

Digital coding and decoding systems require the presence of timing information in addition to the presence of digital information. The timing information is used to synchronize the decoder with the incoming signal, and to indicate where the information bits are to begin and end. Timing information is provided by a transition from one signal level to a second signal level at the beginning of each bit period. Digital information is provided by transitions from one signal level to a second signal level during the bit period.

One method used to obtain timing information is to use a tuned circuit, tuned to the bit period. The tuned circuit produces pulses in response to bits having the correct period, which can be used for timing. The disadvantage of using a tuned circuit is that timing information has to be transmitted for a short period of time prior to the transmission of both timing and data information. This is done in order to allow a sufficient buildup of signal in the tuned circuit to produce the pulses used for timing. The result of this additional transmission is an increase in transmission time and a decrease in the total number of codes which can be transmitted and received in a given period of time.

Digital demodulators can also have the disadvantage that they may produce a spurious output in response to noise pulses present in the received signal. These spurious responses may have the same characteristics as digital information. The spurious responses can prevent operation of the digital decoder, or cause a false operation.

SUMMARY OF THE INVENTION

It is an object of this invention to provide an improved digital demodulator.

Another object of this invention is to provide an improved digital demodulator capable of providing timing information immediately upon receipt of the transmitted signals.

Still another object of this invention is to provide an improved digital demodulator which does not produce a spurious output in response to noise pulses in the received signal.

In practicing this invention a digital demodulator is provided for demodulating a received bit signal containing binary and timing information where the received bit signal shifts between two levels. Transitions at the beginning of each bit period represent timing information. Transitions during a bit period represent binary information. Received bit signals are coupled to a transition detector which detects each transition in level. The transition detector produces a pulse in response to each level transition. The pulse produced by the transition at the beginning of a bit period is used to trigger a monostable multivibrator. Output signals from the monostable multivibrator last approximately 75 percent of a bit period. The monostable multivibrator output signals are used to energize a counter, which counts the following pulses produced by the transition detector. No pulses, or an even number of pulses, counted during a bit period (no transitions or an even number of transitions) indicate a binary one. A single pulse, or an odd number of pulses, during a bit period (one transition or an odd number of transitions) indicates a binary zero. While the present embodiment of this invention assigns a single pulse, or an odd number of pulses, as a binary zero, and no pulses, or an even number of pulses, as a binary one, this assignment can be reversed while still incorporating the features of this invention.

A pulse generator connected to the monostable multivibrator generates a pulse when the monostable multivibrator is energized and another pulse when it turns off. The pulse generated when the monostable multivibrator is turned off is used to energize a shift register which samples and stores the count in the counter. The pulse generated by the pulse generator when the monostable multivibrator is again energized is used to reset the counter in preparation for the next bit period.

If a noise pulse is received by the digital demodulator, the transition detector will produce two pulses in response thereto. One pulse will be produced from the leading edge of the noise pulse, and a second pulse from the trailing edge. The counter used to count the pulses is a bistable multivibrator. It will change state twice in response to the two pulses generated, thereby returning to its original state. If no other pulses are received during that bit period, the shift register will store a ONE at its sample time. If a pulse had been received during the bit period causing the counter to change to a second state, it will revert to the second state at the end of the second pulse generated by the noise pulse. The shift register will then store a zero at its sample time. No error will, therefore, result from the detected noise pulse.

A circuit is provided for coupling the received bit signal from the receiver discriminator to the digital demodulator. The circuit includes an amplifier, a filter, and a reshaping circuit. The amplifier increases and limits the amplitude of the signal received from the receiver discriminator, so that a constant amplitude signal is presented to the filter. The filter is of the low pass type and partially eliminates undesirable high-frequency noise pulses. A reshaping circuit, consisting of a Schmitt trigger, is used to recreate the square wave received bit signals whose edges have been rounded by the low-pass filter. The Schmitt trigger further assists in eliminating high-frequency noise pulses due to its response characteristics.

The timing pulses produced by the pulse generator and the digital information stored in the shift register are coupled to a digital decoder where they are used to actuate the receiver audio circuits.

The invention is illustrated in the drawing in which.

DETAILED DESCRIPTION OF THE INVENTION

Figure 1:
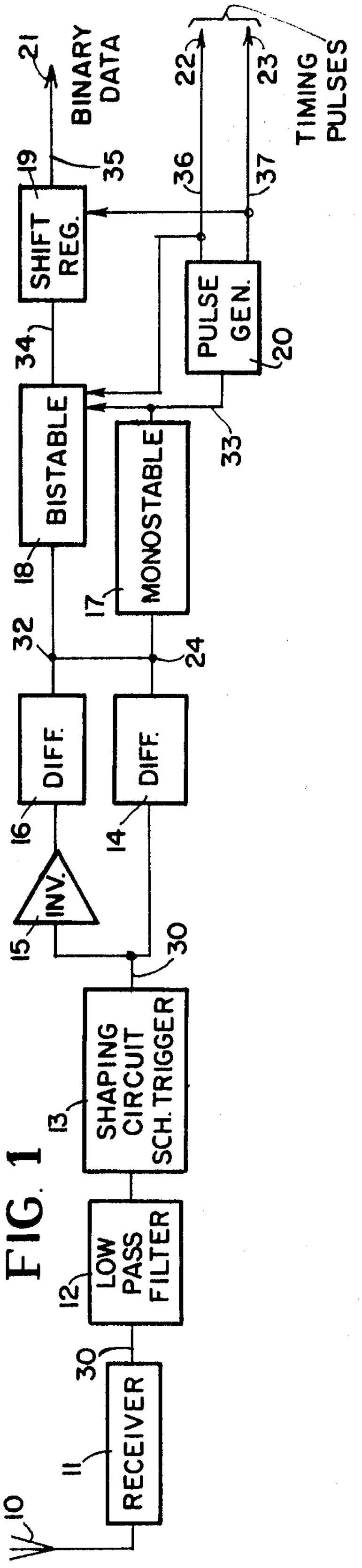
FIG. 1 is a block diagram of a digital demodulator incorporating the features of this invention.

Referring to FIG. 1, the demodulator of the invention is shown used with a radio receiver. Radio frequency signals are received at antenna 10 and coupled to receiver 11 where they are processed in a manner well known in the art. The signal derived is in the form of bits containing binary and timing information. The binary and timing information will be used to operate a digital decoder such as described in copending U.S. Patent application, Ser. No. 48,998, Case No. 69,159) filed June 23, 1970.

Figure 2:
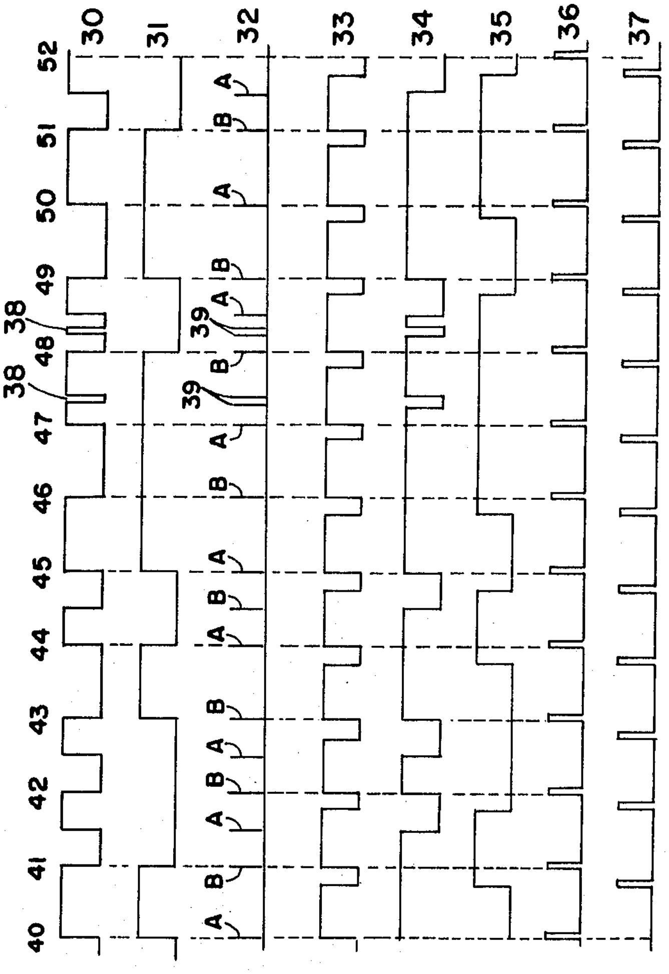
FIG. 2 shows waveforms for various parts of the digital demodulator illustrated in FIG. 1.

Referring to FIG. 2, waveform 30 represents the received bit signal at the output of receiver 11. The time period for each bit of information is shown by the vertical dashed lines indicated as numbers 40 through 52. A change in signal level at the beginning of each bit period is used to provide the timing information. A change in signal level during a bit period is used to represent binary information. The bit in waveform 30 between lines 40 and 41 has no transitions. The absence of a transition represents a binary one. The bit between dashed lines 41 and 42 in waveform 30 has a single transition. A transition during a bit period represents a binary zero. The binary number represented by waveform 30 is, therefore, 100101110110.

Waveform 31 (FIG. 2) shows a signal normally used to denote the above binary number when timing information is not required. The upper level of the signal represents a binary one, the lower level represents a binary zero. The binary number represented by wave form 31 is also 100101110110.

Signals appearing at the discriminator of receiver 11 (FIG. 1) are coupled to low pass filter 12. Low-pass filter 12 attenuates high-frequency noise pulses which may be present at the discriminator of receiver 11. This eliminates a portion of the noise that can cause improper operation. Frequencies in the range of the bit rate frequency are allowed to pass through low-pass filter 12 with only slight attenuation. From low-pass filter 12 the received bit signal is coupled to shaping circuit 13, consisting of a Schmitt trigger. Shaping circuit 13 recreates waveform 30 which was slightly attenuated by low pass filter 12. Shaping circuit 13 further assists in eliminating high-frequency noise pulses due to its response characteristic. From shaping circuit 13 (FIG. 1) the signal is coupled to differentiator 14. Differentiator 14 is responsive to each positive going transition in waveform 30 to produce the pulses labeled A in waveform 32 of FIG. 2. Signals from shaping circuit 13 are also coupled to invertor 15 where they are inverted and coupled to differentiator 16. Differentiator 16 is responsive to the positive going transitions from invertor 15 (negative going transitions shown in waveform 30) to produce pulses labeled B in waveform 32 of FIG. 2. Pulses produced by differentiators 14 and 16 are combined at point 24 to produce the train of pulses labeled A and B shown in waveform 32.

The pulses of waveform 32 are coupled to monostable multivibrator 17. The pulse produced at the beginning of each bit period will trigger monostable multivibrator 17 to produce the output signal shown as waveform 33 in FIG. 2. Monostable multivibrator 17 once energized will remain energized for approximately 75 percent of one bit period. Signals produced by monostable multivibrator 17 are coupled to a counter consisting of bistable multivibrator 18, enabling it and rendering it responsive to the pulses produced at the output of differentiators 14 and 16. If no pulses are received while bistable 18 is enabled, it will not count and will remain in a first state which represents a binary one. If a single pulse is received while bistable 18 is enabled, it will count the pulse and switch to a second state which represents a binary zero. If a second pulse is received while bistable 18 is enabled, it will again count and revert to its first state. No pulses, or an even number of pulses received by bistable 18 represents a binary one. A single pulse, or an odd number of pulses received by bistable 18 represents a binary zero. While the present embodiment of this invention assigns a single pulse, or an odd number of pulses as a binary zero, and no pulses or an even number of pulses as a binary one, this assignment can be reversed while still incorporating the features of this invention.

The output of monostable multivibrator 17 is also coupled to pulse generator 20. Pulse generator 20 generates a first timing pulse when monostable multivibrator 17 turns on, and a second timing pulse when monostable multivibrator 17 turns off. The first timing pulse is shown as waveform 36, the second timing pulse is shown as waveform 37. When monostable multivibrator 17 turns off, the second timing pulse produced by pulse generator 20 is coupled to shift register 19. The second timing pulse enables shift register 19 causing it to sample the state of bistable 18. The state of bistable 18 is shown by waveform 34 in FIG. 2.

At the start of the next bit period, the level transition, as shown in waveform 30, will energize monostable multivibrator 17, which will cause pulse generator 20 to produce a first timing pulse. This first timing pulse is coupled to bistable 18 resetting bistable 18 to its first state at the same time that bistable 18 is energized by the output signal from monostable multivibrator 17. The change in level at the beginning of a bit period is, therefore, used to reset the portion of the demodulator circuit used to derive the digital information, in addition to preparing it to receive the digital information during the following bit period. This prevents the timing information from being recognized as digital information.

Shift register 19 is the preferred embodiment is a two-stage shift register. A two-stage shift register may be used with a decoder such as described in copending U.S. Patent application, Ser. No. 48,998, filed June 23, 1970 (Case No. 69,159). The second timing pulse associated with a bit period will cause the digital information in stage 1 of shift register 19 to shift to stage 2 in addition to allowing stage 1 to sample the content of bistable multivibrator 18.

Shift register 19 is allowed to sample bistable multivibrator 18 only once during each bit period. The sampled information is stored until the second timing pulse associated with the next bit period again energizes shift register 19. At the sampling time bistable multivibrator 18 will be in the state which corresponds to the digital information received. That is, its state will represent a binary zero or binary one. By allowing one sampling of each bit period, after the digital information has been stored in bistable multivibrator 18 and preventing bistable 18 from recognizing timing information as digital information, the shift register will store only the digital information for a bit period. The contents of shift register 19 will therefore be identical to the original transmitted data shown in waveform 31.

Referring to FIG. 2, waveform 30 shows two noise spikes indicated by number 38. These noise spikes are close enough in frequency to the bit rate transmitted to allow them to be coupled through low pass filter 12 without substantial attenuation. The noise spikes when coupled to differentiator 14, and the series circuit of invertor 15 and differentiator 16, will produce a pair of spikes 39 shown in waveform 32 (FIG. 2). Each noise spike produces two pulses which are coupled to bistable 18. Bistable 18 will change state twice in response to these two pulses, reverting to its first state. At the time bistable 18 is sampled by shift register 19, bistable 18 will show the same state as had existed prior to the noise pulses. If bistable 18 had been in the second state when the noise pulses appeared, it would have again been in the second state after the noise pulse. Noise pulses coupled to the digital demodulator will not therefore produce a spurious response from the demodulator.

The binary data derived at the output of shift register 19 (point 21) and represented by waveform 35, and the timing information derived at the output of pulse generator 20 (point 22 and 23) and represented by waveforms 36 and 37, is coupled to a digital decoder. If the proper binary information is received, the decoder will actuate, energizing the receiver.

A digital demodulator is therefore provided which is capable of demodulating combined binary data and timing information into separate timing signals and binary data signals. Timing information necessary to operate a digital decoder is produced before the termination of the first data bit, thereby allowing faster transmission of the data and more messages per unit time. Spurious outputs due to noise spikes in the received signals are substantially eliminated.

We claim:

1. A circuit for demodulating a received bit signal containing binary and timing information wherein the signal shifts between two levels, the shifts or transitions at the beginning of each bit period representing timing and the transitions during a bit period representing binary information, such circuit including in combination, transition detection means for detecting the shifts in level of said received bit signals and producing in response thereto first pulses, monostable multivibrator means coupled to said transition detection means and responsive to said first pulses to produce a second signal including pulses of a predetermined duration shorter than said bit period, pulse generation means coupled to said monostable multivibrator means and responsive to said second signal to produce a first timing signal at the beginning of each pulse of said second signal and a second timing signal at the end of each pulse of said second signal, counter means coupled to said transition detection means, said monostable multivibrator means and said pulse generation means, said second signal pulses enabling said counter means, said counter means counting said first pulses while enabled, storage means coupled to said counter means and pulse generation means, said storage means enabled by said second timing signal to store the count in said counter, said first timing signal resetting said counter means.

2. The circuit of claim 1 further including amplifier means for amplifying said received bit signal, filter means coupled to said amplifier to eliminate undesired signals, and shaping means coupled to said filter means and said transition detection means for coupling said received bit signal to said transition detecting means.

3. The circuit of claim 1 wherein said counter means is a binary counter.

4. The circuit of claim 3 wherein said binary counter is a bistable multivibrator.

5. The circuit of claim 1 wherein said storage means is a shift register.

6. The circuit of claim 1 wherein said transition detection means includes first and second differentiation means, said first differentiation means being responsive to said positive transitions of said received bit signal to produce second pulses, said second differentiation means being responsive to said negative transitions of said received bit signal to produce third pulses, and means combining said second and third pulses to produce said first pulses.

7. The circuit of claim 2 wherein said filter means is a low pass filter.

8. The circuit of claim 2 wherein said shaping means is a Schmitt trigger.

9. A circuit for demodulating a received bit signal containing binary and timing information wherein the received bit signal shifts between two levels, said shifts or transitions representing timing and binary information, such circuit including in combination, transition detection means for detecting said level shifts and producing in response thereto first pulses, first circuit means coupled to said transition detection means and responsive to particular first pulses to produce second signals including pulses of a predetermined duration, second circuit means coupled to said first circuit means and responsive to said second signals to produce a third and fourth signal, said third signal produced at the beginning of each pulse of said second signal, said fourth signal produced at the end of each pulse of said second signal, counter means coupled to said transition detection means, said first circuit means and said second circuit means, said second signals enabling said counter means, said counter means counting said first pulses while enabled, third circuit means coupled to said counter means and second circuit means, said third circuit means enabled by said fourth signal to sample the state of said counting means, said third signal resetting said counter means.

10. The circuit of claim 9 wherein said particular first pulses are produced in response to received bit signal shifts occurring at the beginning of each bit period.

11. The circuit of claim 9 wherein said first circuit means is a monostable multivibrator.

12. The circuit of claim 9 wherein said second circuit means includes pulse generation means.

13. The circuit of claim 9 wherein said counter means includes bistable multivibrator means.

14. The circuit of claim 9 wherein said third circuit means includes shift register means.

15. The circuit of claim 14 wherein said shift register means includes first and second stages for storing the state of said counter means during two successive bit periods.

* * * * *

UNITED STATES PATENT OFFICE
CERTIFICATE OF CORRECTION

Patent No. 3,624,528 Dated November 30, 1971

Inventor(s) Richard H. Adlhoch, et al

It is certified that error appears in the above-identified patent and that said Letters Patent are hereby corrected as shown below:

On the cover sheet, line [72], "Adlhock" should read -- Adlhoch --.

Signed and sealed this 17th day of October 1972.

(SEAL)
Attest:

EDWARD M.FLETCHER,JR.
Attesting Officer

ROBERT GOTTSCHALK
Commissioner of Patents